US008667296B1

(12) United States Patent
Bilinski et al.

(10) Patent No.: US 8,667,296 B1
(45) Date of Patent: Mar. 4, 2014

(54) GENERATING A PASSWORD FROM A MEDIA ITEM

(71) Applicant: Google Inc., Mountain View, CA (US)

(72) Inventors: Brandon Bilinski, San Francisco, CA (US); Jai John Mani, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/648,045

(22) Filed: Oct. 9, 2012

(51) Int. Cl.
*G06F 21/00* (2013.01)
*G06F 21/46* (2013.01)

(52) U.S. Cl.
CPC .................................... *G06F 21/46* (2013.01)
USPC ................................ 713/184; 726/6; 726/18

(58) Field of Classification Search
None
See application file for complete search history.

(56) References Cited

U.S. PATENT DOCUMENTS 5,850,448 A * 12/1998 Ganesan ..................... 713/184
6,006,333 A * 12/1999 Nielsen ......................... 726/8
6,279,018 B1 8/2001 Kudrolli et al.
7,434,061 B2 * 10/2008 Moseley ..................... 713/184
7,475,343 B1 1/2009 Mielenhausen
7,552,469 B2 6/2009 Diffie et al.
7,873,995 B2 1/2011 Bagga et al.
2005/0045373 A1 * 3/2005 Born ........................... 174/254
2008/0148375 A1 * 6/2008 Yamamoto et al. ............. 726/7
2009/0064321 A1 * 3/2009 Dick et al. .................... 726/21
2010/0299716 A1 * 11/2010 Rouskov et al. ................ 726/1
2011/0055585 A1 * 3/2011 Lee ............................. 713/183

OTHER PUBLICATIONS

Ashley, Erik, "Creating the Ideal Password", Aug. 8, 2012, Downloaded on Feb. 7, 2013 from http://www.vircom.com/security/creating-the-ideal-password/.*
"The Diceware Passphrase FAQ", Dec. 6, 1998, Downloaded at http://web.archive.org/web/19981206081253/http://world.std.com/~reinhold/dicewarefaq.html on Feb. 7, 2013.*
"Creating a Strong Password", Stanford School of Medicine, Dec. 13, 2010, Downloaded at http://web.archive.org/web/20101213160929/http://med.stanford.edu/irt/security/protecting/set_passwds.html on Feb. 7, 2013.*

* cited by examiner

*Primary Examiner* — Matthew Henning
(74) *Attorney, Agent, or Firm* — Leydig, Voit & Mayer, Ltd.

(57) ABSTRACT

A method for generating a password for a user account. The method includes selecting a media item from a media library associated with a user; selecting a portion of the media item; generating a password based on the selected portion of the media item, where at least a portion of the password is based on selecting a first letter of a word included in the portion of the media item; and presenting the password as a suggested password to the user.

18 Claims, 9 Drawing Sheets

START
500
Analyze metadata corresponding to one or more media items included in a media library 502
Select a first media item from the media library based on the metadata 504
Analyze the metadata of the first media item 506
Select a first portion of the first media item 508
Generate a password based on the first portion of the first media item 510
Present the password in a user interface as a suggested password 512
END

GENERATING A PASSWORD FROM A MEDIA ITEM

BACKGROUND

One common authentication scheme for computerized software and services is to allow users to set their own username and/or password. However, no matter how much education there is around best practices for password creation, users still often choose very simple passwords, such as "password" or "password123" for the account password. User accounts with simple passwords can be easily hacked by an outsider and are less secure than accounts with strong passwords.

In addition, even if a user sets a strong password, the user often uses the same strong password for multiple accounts. Therefore, if the password is compromised for one account, then the password could be used to hack other accounts that utilize the same password. Another problem with strong passwords is that users have a hard time remembering the strong passwords.

Accordingly, there remains a need for a system and method for generating strong and unique passwords that can be easily remembered by the user.

SUMMARY

One embodiment provides a method for generating a password for a user account. The method includes selecting a media item from a media library associated with a user, wherein the media library is stored in one or more storage units; selecting a portion of the media item, wherein the portion of the media item includes less than all of the media item; identifying one or more words included in the portion of the media item; generating a password based on the selected portion of the media item, where at least a portion of the password is based on selecting a first letter of one or more words included in the portion of the media item; and presenting the password as a suggested password to the user in a user interface displayed on a display device.

Another embodiment provides a computer-readable storage medium storing instructions that, when executed by a processor, cause a computer system to generate a password, by performing the steps of: selecting a media item from a media library associated with a user; selecting a portion of the media item; generating a password based on the selected portion of the media item, where at least a portion of the password is based on selecting a first letter of a word included in the portion of the media item; and presenting the password as a suggested password to the user.

Yet another embodiment provides a system for generating a password. The system includes one or more servers configured to store a media library of a user and a local computer device coupled to the remote server and executing a browser application. The local computer device is configured to: select a media item from the media library, select a portion of the media item, generate a password based on the selected portion of the media item, where at least a portion of the password is based on selecting a first letter of a word included in the portion of the media item, and present the password as a suggested password to the user.

DETAILED DESCRIPTION OF EXAMPLES

Embodiments of the disclosure provide a system and method for generating a password for a user account. In one embodiment, the password is generated based on a media item in a user's media library. Examples of media items include music, movies, television shows, books, magazines, etc. In one embodiment, a software application selects a media item from the media library. The media item can be selected manually by the user or automatically by the software application. Examples of criteria used to automatically select the media item include the most recently played media item, highest rated media item, annotated media item (e.g., books and magazines), media item or portion thereof shared with others, the number of playlists in which the media item is included, search history for the media item (e.g., search for the lyrics to the media item on a search engine), among others.

Once the media item from which the password will be generated is identified, the software application selects a lyric/verse from the media. According to various embodiments, the selected lyric/verse may be selected at random, selected as the chorus, selected as the most commented-on lyric, selected as being a sample of the media item that has been shared with others, among others.

Once the lyric/verse is selected, the software application converts the lyric/verse into a password. In some embodiments, the first letter of each word of the lyric/verse is identified and forms an acronym. Some of the letters may be modified, including randomizing capitalization/lowercase, converting certain words to "text-speak" (e.g., the word "you" is converted to "u"), converting letters to numbers or symbols (e.g., "S" is converted to "$," or "E" is converted to "3"), some words may be left spelled-out in full, and/or punctuation can be added between lines/stanzas of the media item. In some embodiments, additional words or characters can be appended or prepended to the automatically generated password.

The user is presented with the generated password and can accept the password as his or her new password, or may modify the password. The user may modify any of the characters, may append or prepend additional characters to the password, or may request that a new password be generated by the software application.

In one embodiment, the software application disclosed herein could be included as a web browser extension of a web browser application. In another embodiment, the software application is included in a stand-alone application widget (e.g., via JavaScript) that is embedded into web pages or software applications for password generation assistance.

Figure 1:
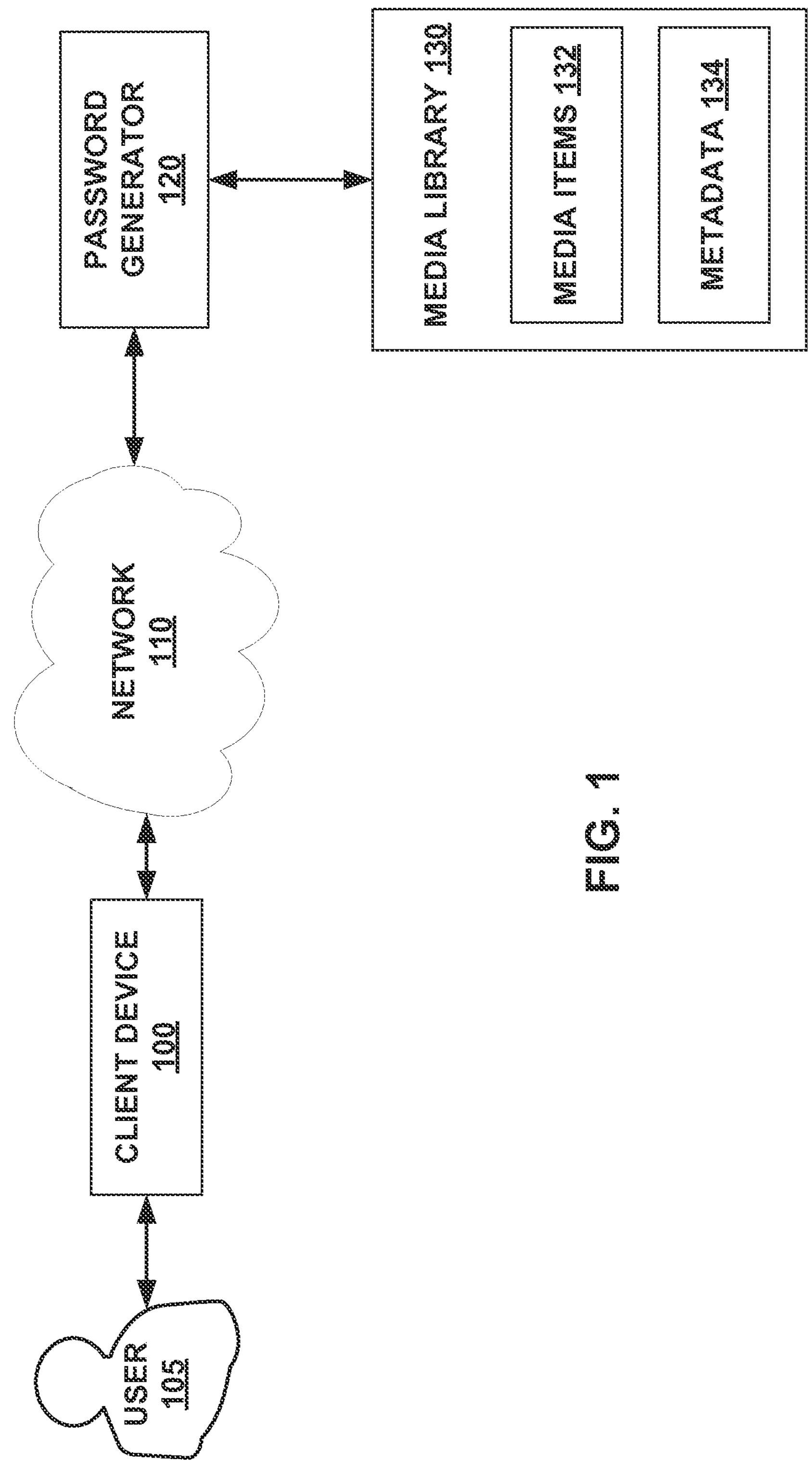
FIG. 1 is a block diagram of an example password generation environment, according to one embodiment.

FIG. 1 is a block diagram of an example password generation environment, according to one embodiment. In the embodiment illustrated by FIG. 1, a user 105 operates a client device 100 that communicates with a password generator software application 120 over a network 110.

The client device 100 can be any type of computing device, including a personal computer, laptop computer, mobile phone with advanced computing capabilities (i.e., a "smartphone"), or any other type of computing device. The client device 100 includes application(s), a communications client, output devices (e.g., a display), and input devices (e.g., keyboard, mouse, touch screen). In some embodiments, a client device 100 may act as both an output device and an input device. An example of an application executing client device 100 is a web browser application. The web browser application and/or other applications on the client device 100 provide social media functionality, web browsing capabilities, calendars, contact information, games, document processing, and/or document sharing, among others.

The network 110 can be any type of communications network, including an Internet network (e.g., wide area network (WAN) or local area network (LAN)), wired or wireless network, or mobile phone data network, among others.

In one embodiment, the password generator software application 120 has access to a media library 130 associated with the user 105. The media library 130 stores one or more media items 132 and metadata 134 associated with the media items 132. Examples of media items 132 include music, movies, television shows, books, magazines, etc. Examples of metadata 134 include a play count of each media item, one or more media items most recently played/viewed, one or more rated media items, annotated media items (e.g., annotated books and magazines), one or more media items or portions thereof shared with other users, a count of the number of playlists in which each media item is included, a search history for one or more media items (e.g., searches for the lyrics to a media item on a search engine), among others.

In one embodiment, the media library 130 is stored on one or more servers and/or databases accessible over the network 110 (e.g., "cloud-based" storage). According to various embodiments, each server can be a physically separate machine or can be different processes running within the same physical machine. In another embodiment, the media library 130 is stored within the client device 100 or another device associated with the user 105.

As described in greater detail herein, the password generator software application 120 is configured to generate a password for a user account based on the media items 132 and/or metadata 134 in the media library 130.

Figure 2:
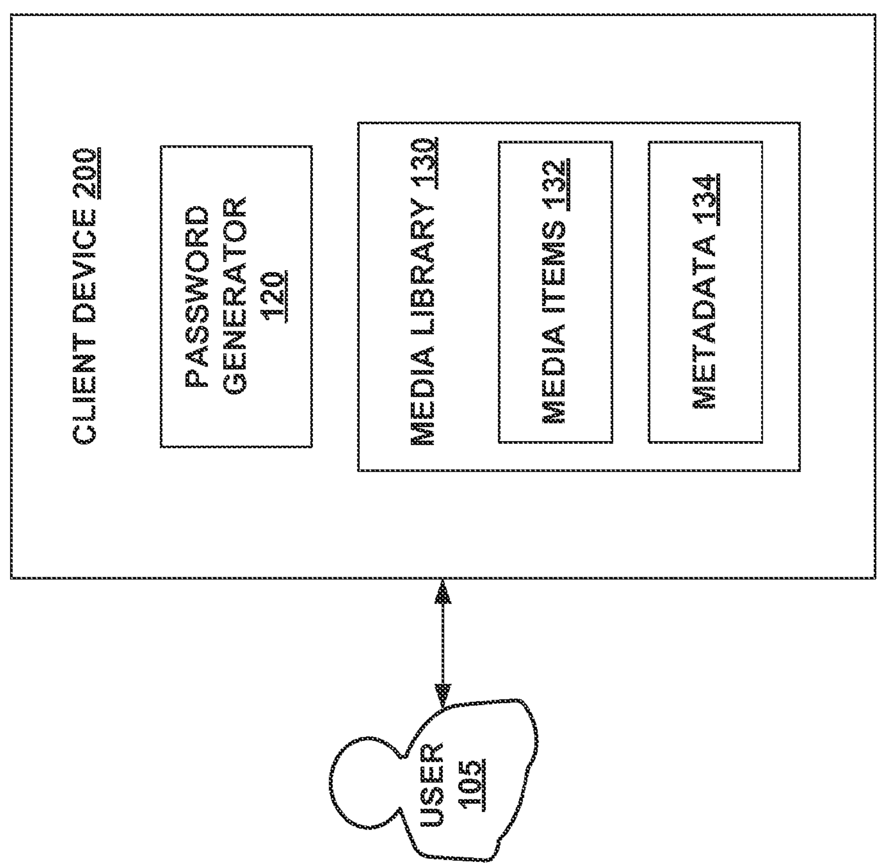
FIG. 2 is a block diagram of another example password generation environment, according to one embodiment.

FIG. 2 is a block diagram of another example password generation environment, according to one embodiment. As shown, a user 105 interacts with a client device 200. The client device 200 in FIG. 2 includes similar and/or different elements and functions as client device 100 in FIG. 1.

In the embodiment shown in FIG. 2, the password generator software application 120 is included within the client device 200. For example, the password generator software application 120 can be included as part of a web browser extension to a web browser application executing on the client device 200. In another example, the password generator software application 120 is included as a stand-alone application widget (e.g., implemented as a JavaScript) that is embedded into a web page or software application executed by the computing device 200. As also shown in FIG. 2, the media library 130, including the media items 132 and metadata 134, is also stored within the computing device.

Again, as described in greater detail herein, the password generator software application 120 is configured to generate a password for a user account based on the media items 132 and/or metadata 134 in the media library 130.

Figure 3:
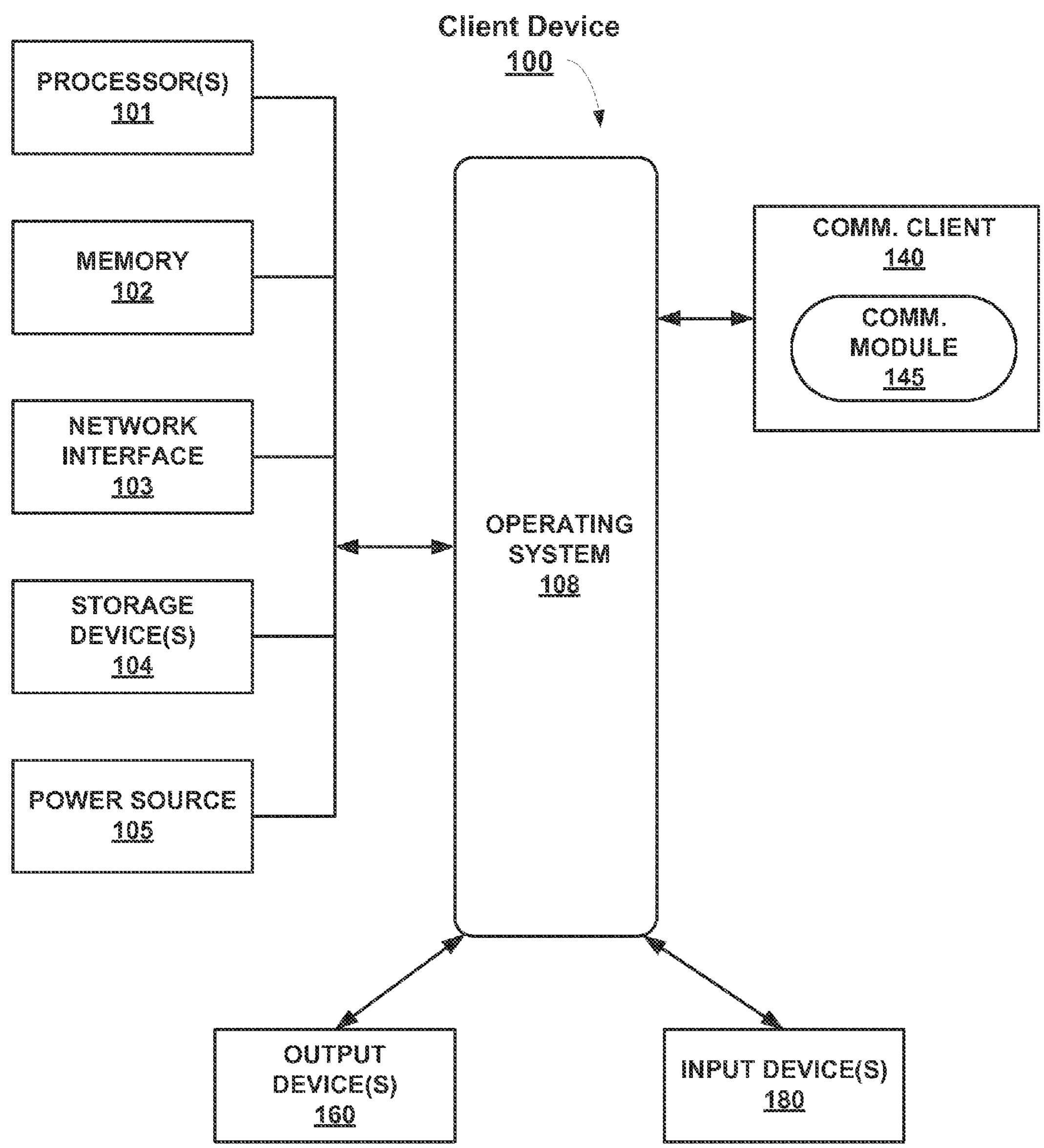
FIG. 3 is a block diagram of example functional components for a client device, according to one embodiment.

FIG. 3 is a block diagram of example functional components for a client device 100, according to one embodiment. Many other embodiments of the client device 100 may be used. In the illustrated embodiment of FIG. 3, the client device 100 includes one or more processors 101, memory 102, a network interface 103, one or more storage devices 104, a power source 105, output device(s) 160, and input device(s) 180. The client device 100 also includes an operating system 108, a communications client 140, and a local server 165 that are executable by the client. Each of components 101, 102, 103, 104, 105, 160, 180, 108, 140, and 165 are interconnected physically, communicatively, and/or operatively for inter-component communications in any operative manner.

As illustrated, processors 101 are configured to implement functionality and/or process instructions for execution within client device 100. For example, processors 101 execute instructions stored in memory 102 or instructions stored on storage devices 104. Memory 102, which may be a non-transient, computer-readable storage medium, is configured to store information within client device 100 during operation. In some embodiments, memory 102 includes a temporary memory, area for information not to be maintained when the client device 100 is turned OFF. Examples of such temporary memory include volatile memories such as random access memories (RAM), dynamic random access memories (DRAM), and static random access memories (SRAM). Memory 102 maintains program instructions for execution by the processors 101.

Storage devices 104 also include one or more non-transient computer-readable storage media. Storage devices 104 are generally configured to store larger amounts of information than memory 102. Storage devices 104 may further be configured for long-term storage of information. In some examples, storage devices 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 100 uses network interface 103 to communicate with external devices via one or more networks, such as one or more Internet and/or wireless networks. Network interface 103 may be a network interface card, such as an Ethernet card, an optical transceiver, a radio frequency transceiver, or any other type of device that can send and receive information. Other non-limiting examples of network interfaces include Bluetooth®, 3G (3rd Generation) and WiFi® radios in mobile computing devices, and USB (Universal Serial Bus). In some embodiments, the client device 100 uses network interface 103 to wirelessly communicate with an external device, a mobile phone, or other networked computing device.

The client device 100 includes one or more input devices 180. Input device 180 is configured to receive input from a user through tactile, audio, and/or video feedback. Non-limiting examples of input device 180 include a presence-sensitive screen, a mouse, a keyboard, a voice responsive system, a video camera, a microphone, or any other type of device for detecting a command from a user. In some examples, a presence-sensitive screen includes a touch-sensitive screen.

One or more output devices 160 are also included in client device 100. Output device 160 is configured to provide output to a user using tactile, audio, and/or video stimuli. Output device 160 may include a display screen (part of the presence-sensitive screen), a sound card, a video graphics adapter card, or any other type of device for converting a signal into an appropriate form understandable to humans or machines. Additional examples of output device 160 include a speaker, a cathode ray tube (CRT) monitor, a liquid crystal display (LCD), or any other type of device that can generate intelligible output to a user. In some embodiments, a device may act as both an input device and an output device.

The client device 100 includes one or more power sources 105 to provide power to the client device. Non-limiting examples of power source 105 include single-use power sources, rechargeable power sources, and/or power sources developed from nickel-cadmium, lithium-ion, or other suitable material.

The client device 100 includes an operating system 108, such as the Android® operating system. The operating system 108 controls operations of the components of the client device 100. For example, the operating system 108 facilitates the interaction of communications client 140 and local server 165 with processors 101, memory 102, network interface 103, storage device(s) 104, input device 180, output device 160, and power source 105.

As illustrated in FIG. 3, the client device 100 includes communications client 140. Communications client 140 includes communications module 145. Each of communications client 140 and communications module 145 includes program instructions and/or data that are executable by the client device 100. For example, in one embodiment, communications module 145 includes instructions causing the communications client 140 executing on the client device 100 to perform one or more of the operations and actions described in the present disclosure. In some embodiments, communications client 140 and/or communications module 145 form a part of operating system 108 executing on the client device 100.

In one embodiment, the media library of a user is stored in a remote location, such as one or more external servers, and is accessible via the communications client 140 and communications module 145. In another embodiment, the media library of the user is stored in the storage device 104 included in the client device 100. In still further embodiment, a portion of the media library is stored at a remote location and a portion of the media library is stored on the client device 100.

Figure 4:
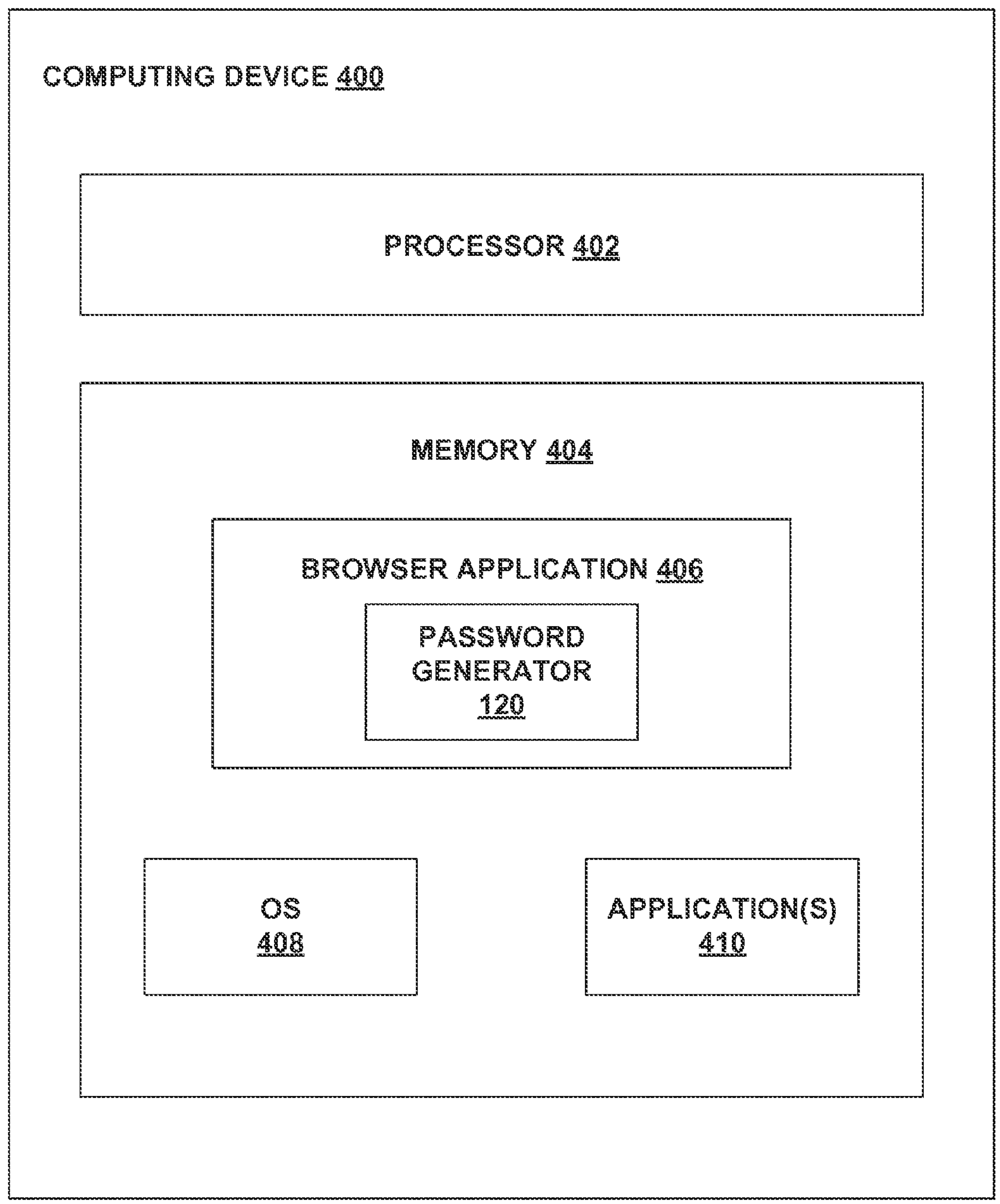
FIG. 4 is a block diagram of a password generation software application executed within a browser application, according to one embodiment.

FIG. 4 is a block diagram of a password generation software application 120 executed within a browser application 406, according to one embodiment. As shown, a computing device 400 includes a processor 402 and a memory 404. The memory includes a browser application 406, an operating system 408, and one or more additional applications 410. The password generation software application 120 is embedded in the browser application 406.

In one embodiment, the password generation software application 120 is embedded in the browser application 406 as a browser extension or add-on. As is known, browser applications allow browser extensions to be installed that enhance the functionality of the browser application. The password generation software application 120 embodied as a browser extension could provide one or more buttons included in the taskbar of the browser application that allow the password generation software application 120 to generate a password from a media item. For example, the user may be using the browser application to create an account for a particular website. When the user encounters the webpage at which the user selects a password for the new account, the user can click on a button included in the browser extension. The browser extension can then generate a password for the user and suggest the password to the user to use as the password for the new account.

In another embodiment, the password generation software application 120 is embedded in the browser application 406 as part of the webpage at which a user sets an account password. For example, when the user encounters the webpage at which the user is to select a password for the new account, a separate button and/or frame is embedded in the webpage that allows the password generation software application 120 to generate a password from the user's media library. In some embodiments, the user may be redirected to another webpage to log-in to an account associated with the media library so that the password generation software application 120 can access the media library.

Figure 5:
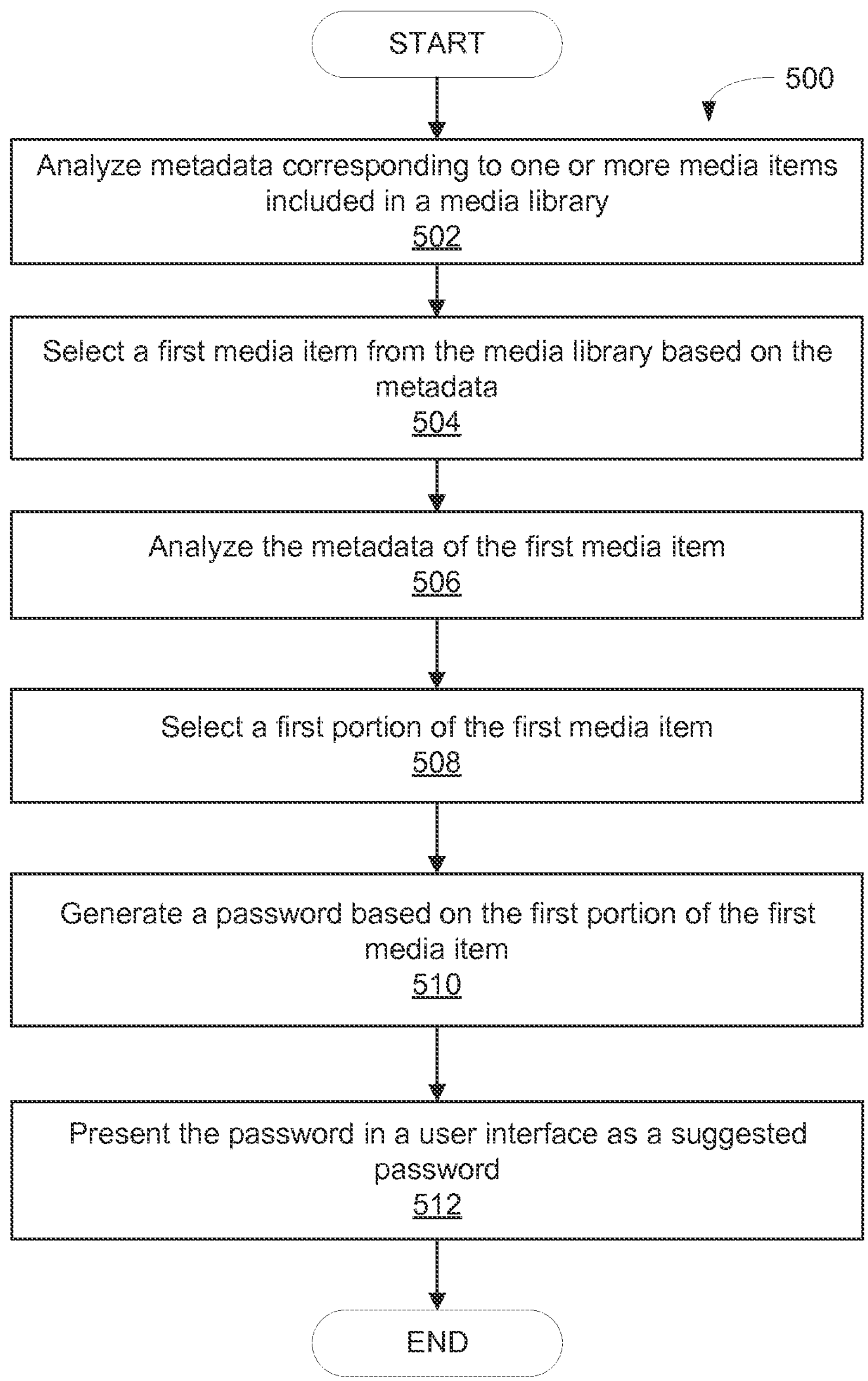
FIG. 5 is a flowchart illustrating generating a password based on an automatically selected media item, according to one embodiment.

FIG. 5 is a flowchart illustrating generating a password based on an automatically selected media item, according to one embodiment. Persons skilled in the art will understand that even though the method 500 is described in conjunction with the systems of FIGS. 1-4, any system configured to perform the method stages is within the scope of embodiments of the disclosure.

As shown, at stage 502, a password generation software application analyzes metadata corresponding to one or more media items included in a media library. As described, examples of media items include music, movies, television shows, books, magazines, etc. Examples of metadata includes a play count of each media item, one or more media items most recently played/viewed, one or more rated media items, annotated media items (e.g., annotated books and magazines), one or more media items or portions thereof shared with other users, a count of the number of playlists in which each media item is included, a search history for one or more media items (e.g., searches for the lyrics to a media item on a search engine), recently uploaded/saved media items, among others.

At stage 504, the password generation software application selects a first media item from the media library based on the metadata. Selecting the first media item can be based on one or more of the metadata described above. In some embodiments, certain metadata is weighted more highly when selecting the first media item.

At stage 506, the password generation software application analyzes the metadata of the first media item and, at stage 508, the password generation software application selects a first portion of the first media item. For example, the first portion may be one or more lyrics, verses, stanzas, or lines in the media item. The first portion of the first media item may be selected at random, may be selected as the chorus of the media item, may be selected as being the most popular or commented-on portion of the media item, selected as being a portion of the media item shared to others by the user, or selected via any other mechanism. In some embodiments, the portion of the media item that is selected is dependent on the media type (e.g., music, movie, television show, book, magazine, etc.) of the first media item.

In some embodiments, stage 506 is optional and is omitted.

At stage 510, the password generation software application generates a password based on the first portion of the first media item. One or more words includes in the first portion of the first media item are identified based on performing a transcription of the first portion of the media item, parsing the text of the first portion of the media item, and/or searching a database of text/lyrics associated with the first portion of the media item.

In some embodiments, the first letter of each word of the selected first portion is identified and forms an acronym. Some of the letters may be modified, including randomizing capitalization/lowercase, converting certain words to "text-speak" (e.g., the word "you" is converted to "u"), converting letters to numbers or symbols (e.g., "S" is converted to "$," or "E" is converted to "3"), some words may be left spelled-out in full, and punctuation and/or one more other characters can be inserted into the acronym. For example, punctuation can be inserted at breaks in the portion of the media item, such as between lines/stanzas. In some embodiments, additional words or characters can be appended to the automatically generated password.

At stage 512, the password generation software application presents the password in a user interface as a suggested password. The user can choose to accept the password as his or her new password, may modify the suggested password, or may request the password generation software application to generate a new password. According to various embodiments, the newly generated password could be generated based on (a) the same first media item and the same first portion of the first media item, (b) the same first media item and a different portion of the first media item, or (c) the a different media item.

Figure 6:
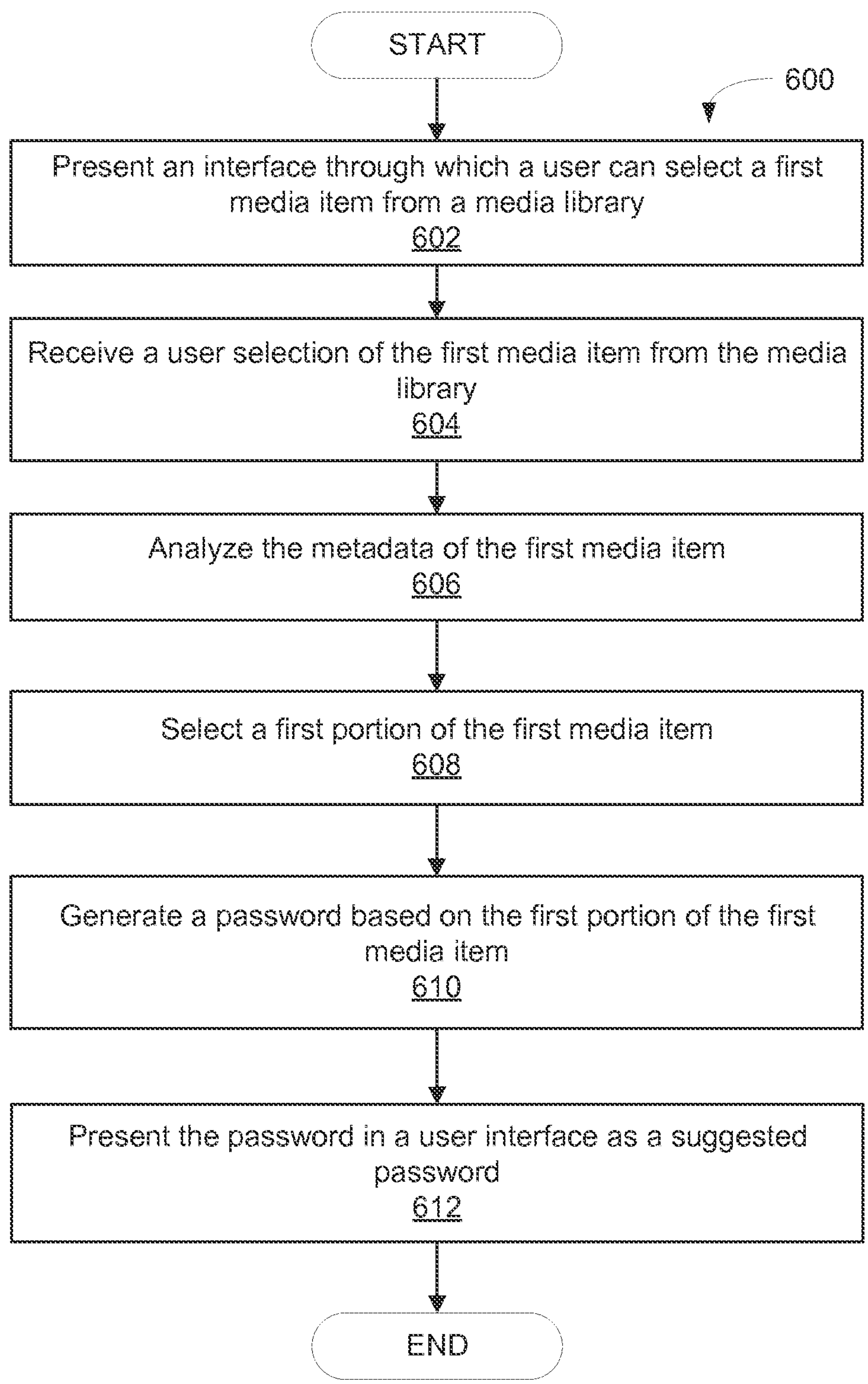
FIG. 6 is a flowchart illustrating generating a password based on a media item selected by a user, according to one embodiment.

FIG. 6 is a flowchart illustrating generating a password based on a media item selected by a user, according to one embodiment. Persons skilled in the art will understand that even though the method 600 is described in conjunction with the systems of FIGS. 1-4, any system configured to perform the method stages is within the scope of embodiments of the disclosure.

As shown, at stage 602, a password generation software application presents an interface through which a user can select a first media item from a media library. In one embodiment, the interface presents the user access to the entire media library from which the user can input a selection of the first media item. In another embodiment, the password generation software application selects a subset of the media library based on the metadata (e.g., two or more media items) and the user makes a selection of the first media item from the subset.

At stage 604, the password generation software application receives the user selection of the first media item.

At stage 606, the password generation software application analyzes the metadata of the first media item and, at stage 608, the password generation software application selects a first portion of the first media item. At stage 610, the password generation software application generates a password based on the first portion of the first media item. At stage 612, the password generation software application presents the password in a user interface as a suggested password. In one embodiment, stages 606, 608, 610, and 612 in FIG. 6 are substantially similar to stages 506, 508, 510, and 512 in FIG. 5, respectively.

Figure 7:
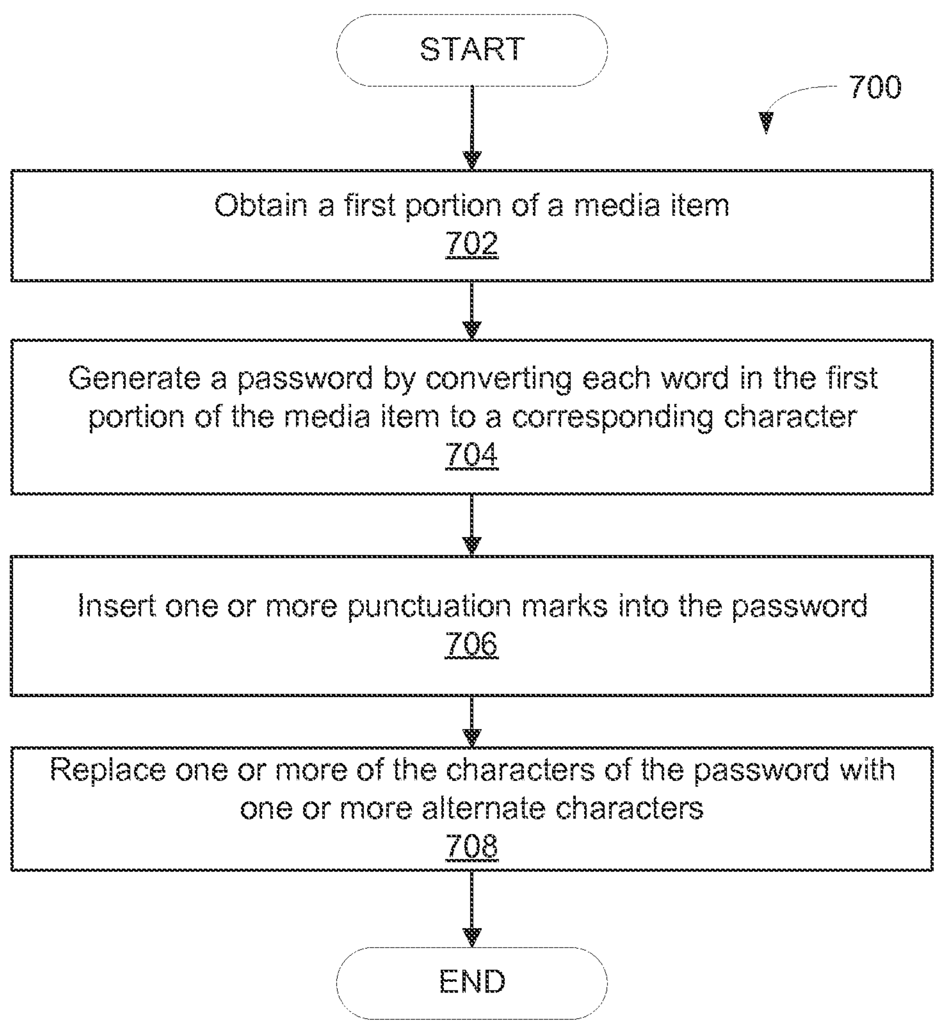
FIG. 7 is a flowchart illustrating generating a password from a portion of media item, according to one embodiment.

FIG. 7 is a flowchart illustrating generating a password from a portion of media item, according to one embodiment. Persons skilled in the art will understand that even though the method 700 is described in conjunction with the systems of FIGS. 1-4, any system configured to perform the method stages is within the scope of embodiments of the disclosure.

As shown, at stage 702, a password generation software application obtains a first portion of a media item. In one embodiment, the first portion is obtained via step 508 in FIG. 5 or step 608 in FIG. 6.

At stage 704, the password generation software application generates a password by converting each word in the first portion of the media item to a corresponding character.

At stage 706, the password generation software application inserts one or more punctuation marks into the password. For example, a period (i.e., the character ".") could be inserted at a break in the portion of the media item, such as between lines or stanzas in the portion of the media item.

At stage 708, the password generation software application replaces one or more of the characters of the generated password with one or more alternate characters. For example, some of the characters may be capitalized, replaced with symbols (e.g., "S" replaced with "$"), and/or spelled out it full (e.g., the letter "u" is replaced with "you").

The generated password is then presented to the user as a suggested password. In some embodiments, steps 706 and 708 are optional and are omitted. In some embodiments, as described, the user can modify the suggested password and/or append or prepend one or more characters to the suggested password.

Further, in some embodiments, the suggested password is compared to a universal password list for all users so that each password is unique, even if based on the same portion of the same media item.

As an example, the selected media item may be William Shakespeare's Hamlet based on being the most highly rated media item in the user's media library. The selected verse may be "To be or not to be, that is the question," based on being the most popular verse, according to comments made on the verse from a large number of users. The password generation software application can generate the password "TboN2b.Titq" based on this verse. As shown in the example, the acronym includes three capital letters, punctuation between lines of the verse, and the word "to" converted to the number "2." Many other passwords could be generated based on this same verse according to the embodiments described above.

Figure 8:
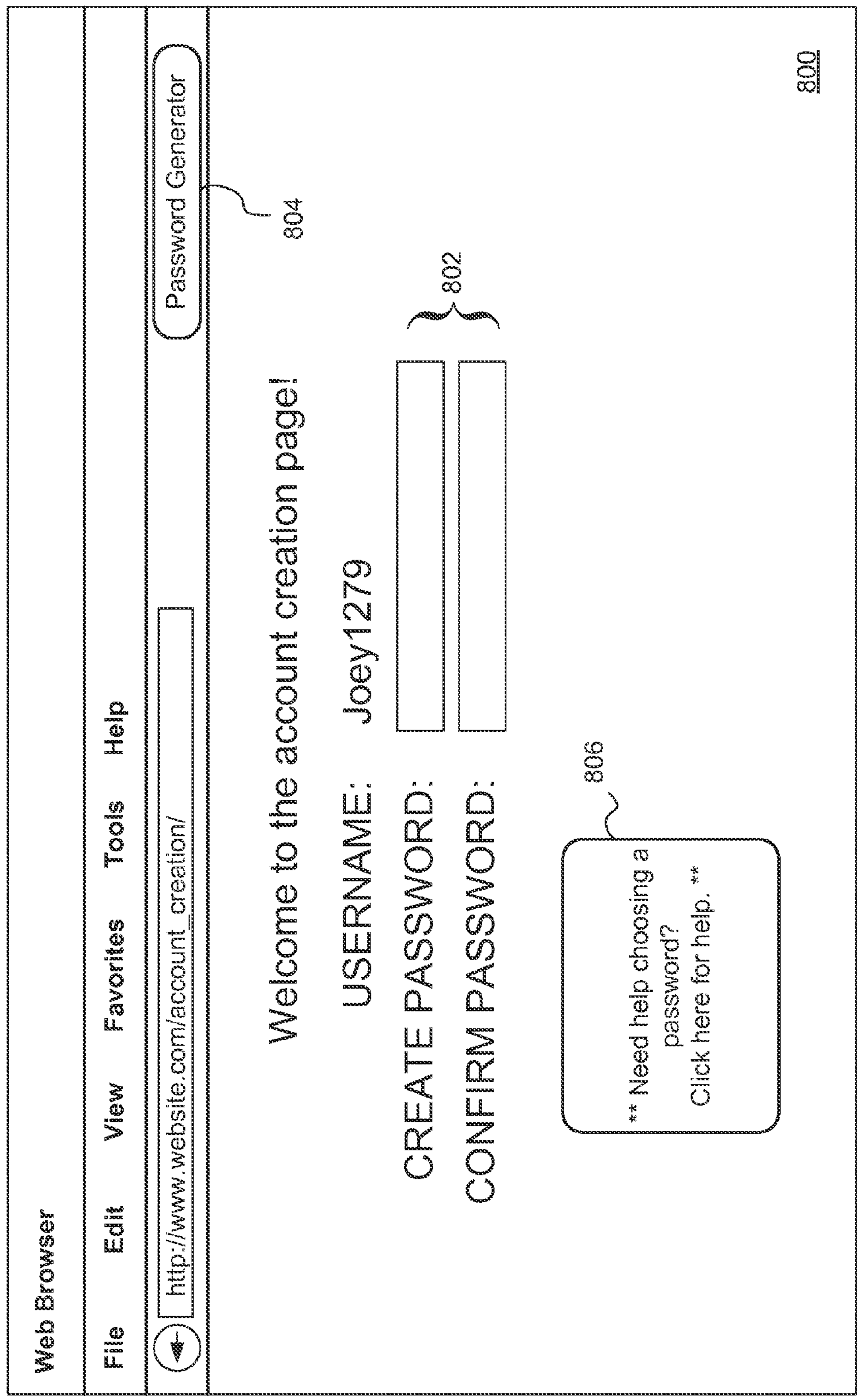
FIG. 8 is a conceptual diagram illustrating a browser application configured to generate a password from a media item, according to one embodiment.

FIG. 8 is a conceptual diagram illustrating a browser application 800 configured to generate a password from a media item, according to one embodiment. As shown, a user has navigated to a webpage for creating a password 802 to a new user account using the browser application 800. As also shown, a browser extension is installed in the browser application 800 and includes a button 804 in the taskbar of the browser application 800. If the user selects the button 804, the password generation software application can generate a suggested password for the user.

Also, FIG. 8 shows a link 806 embedded in the webpage from which the user can access the password generation software application to generate a suggested password. If the user selects the button 804 or link 806, a pop-up window or new webpage can be opened that shows the generated suggested password, as shown in FIG. 9.

Figure 9:
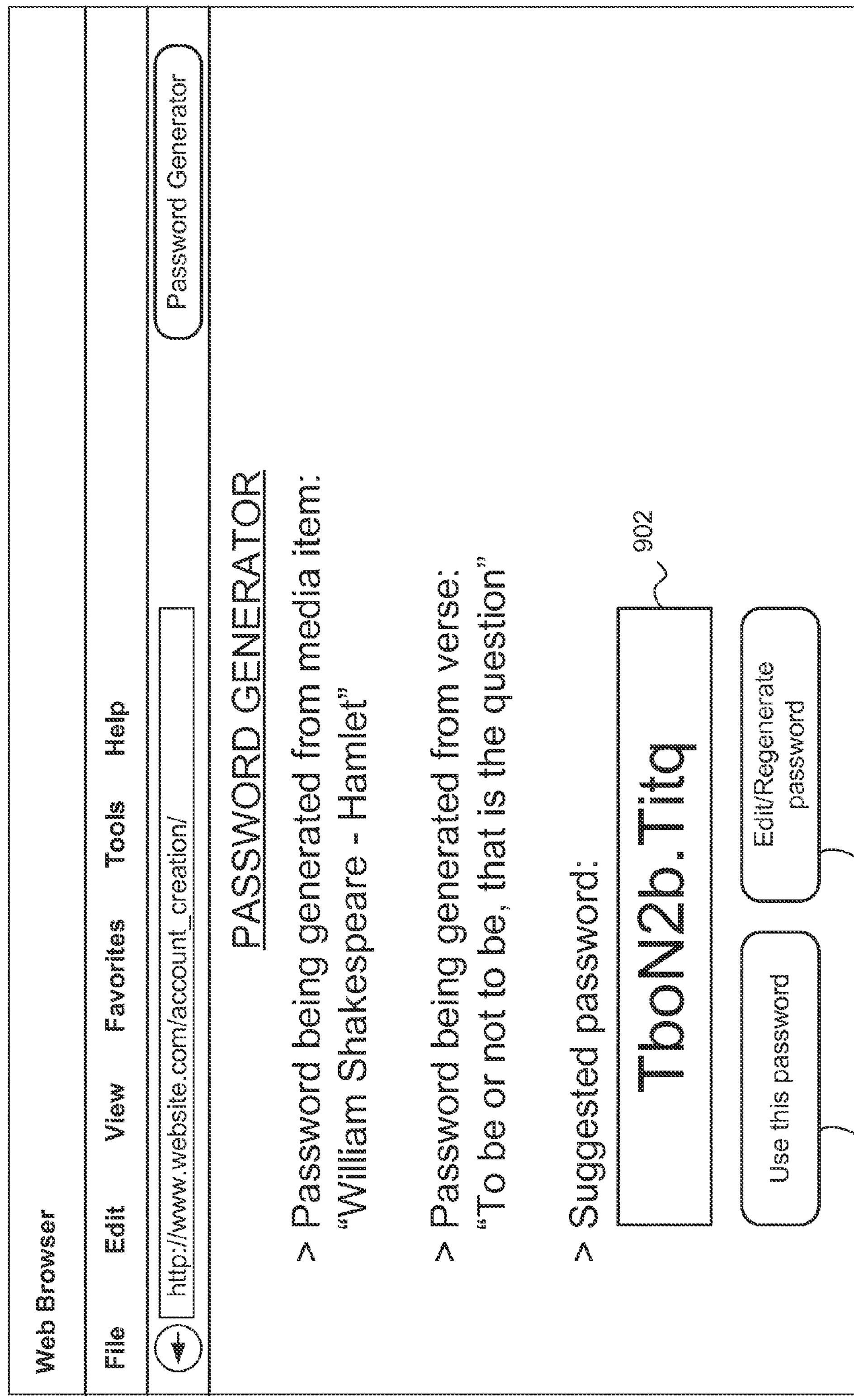
FIG. 9 is a conceptual diagram illustrating an example of a password generated from a media item, according to one embodiment.

FIG. 9 is a conceptual diagram illustrating an example of a password generated from a media item, according to one embodiment. In the example shown, a password 902 is generated from the William Shakespeare's Hamlet and the verse "To be or not to be, that is the question." The web browser also provides links for the user to accept/use 904 the generated password or to edit/regenerate 906 a new suggested password.

Advantageously, embodiments of the disclosure provide a system and method for users to create strong, yet memorable passwords. By using embodiments of the disclosure to generate passwords, user account will be more secure and less likely to be hacked or guessed by an attacker.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. Skilled artisans may employ such variations as appropriate, and the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for generating a password for an account, comprising:

selecting a media item from a media library based on at least one of a most recently played media item in the media library, a highest rated media item in the media library, an annotated media item, a media item or a portion thereof shared with others, and a number of playlists in which a media item is included, wherein the media library is stored in one or more storage units;

selecting a portion of the media item, wherein the portion of the media item includes less than all of the media item;

identifying one or more words included in the portion of the media item;

generating a password based on the selected portion of the media item, wherein at least a portion of the password is based on selecting a first letter of one or more words included in the portion of the media item; and presenting the password as a suggested password in an interface displayed on a display device.

2. A method according to claim 1, wherein the media item comprises a music file, a video file, a book file, or a magazine file.

3. A method according to claim 1, wherein selecting the portion of the media item comprises selecting a chorus of the media file, selecting a random portion of the media file, selecting a commented-on portion of the media item, or selecting a portion of the media items shared with others.

4. A method according to claim 1, wherein generating the password comprises generating an acronym from the first letter of each word in the portion of the media item.

5. A method according to claim 1, wherein generating the password comprises randomizing capitalization of characters in the password.

6. A method according to claim 1, wherein generating the password comprises converting one or more words of the portion of the media item to text-speak, symbols, or numbers.

7. A method according to claim 1, further comprising adding punctuation to the generated password.

8. A method according to claim 7, wherein the punctuation is based on a break in the media item.

9. A computer-readable storage device storing instructions that, when executed by a processor, cause a computer system to generate a password, by performing the steps of:

selecting a media item from a media library based on at least one of a most recently played media item in the media library, a highest rated media item in the media library, an annotated media item, a media item or a portion thereof shared with others, and a number of playlists in which a media item is included;

selecting a portion of the media item;

generating a password based on the selected portion of the media item, wherein at least a portion of the password is based on selecting a first letter of a word included in the portion of the media item; and presenting the password as a suggested password in an interface.

10. A system for generating a password, such system comprising:

one or more servers configured to store a media library; and a local computer device coupled to the remote server and executing a browser application configured to:

select a media item from the media library based on at least one of a most recently played media item in the media library, a highest rated media item in the media library, an annotated media item, a media item or a portion thereof shared with others, and a number of playlists in which a media item is included, select a portion of the media item, generate a password based on the selected portion of the media item, wherein at least a portion of the password is based on selecting a first letter of a word included in the portion of the media item, and present the password as a suggested password in an interface.

11. A system according to claim 10, wherein the media item comprises a music file, a video file, a book file, or a magazine file.

12. A system according to claim 10, wherein selecting the portion of the media item comprises selecting a chorus of the media file, selecting a random portion of the media file, selecting a commented-on portion of the media item, or selecting a portion of the media items shared with others.

13. A system according to claim 10, wherein generating the password comprises generating an acronym from the first letter of each word in the portion of the media item.

14. A system according to claim 10, wherein generating the password comprises randomizing capitalization of characters in the password.

15. A system according to claim 10, wherein generating the password comprises converting one or more words of the portion of the media item to text-speak, symbols, or numbers.

16. A system according to claim 10, further comprising adding punctuation to the generated password.

17. A system according to claim 16, wherein the punctuation is based on a break in the media item.

18. A system according to claim 10, wherein the password is generated by a browser extension associated with the browser application or by code embedded in a webpage accessed by the browser application.

* * * * *